United States Patent [19]
Harris

[11] 3,838,282
[45] Sept. 24, 1974

[54] SENSORS

[75] Inventor: Philip Brian Harris, St. Albans, England

[73] Assignee: National Research Development Corporation, London, England

[22] Filed: Apr. 19, 1973

[21] Appl. No.: 352,691

[30] Foreign Application Priority Data
Apr. 25, 1972 Great Britain.................... 17511/72

[52] U.S. Cl.................. 250/372, 250/461, 250/487, 252/301.4 F, 250/301.6 S
[51] Int. Cl. ............................................. G01t 1/00
[58] Field of Search .......... 250/372, 461, 370, 361, 250/365, 487; 252/301.6 S, 301.4 F

[56] References Cited
UNITED STATES PATENTS

| | | | |
|---|---|---|---|
| 2,021,907 | 11/1935 | Zworykin | 250/372 |
| 2,073,381 | 3/1937 | Sell | 250/302 |
| 2,128,110 | 8/1938 | Wilson | 250/372 |
| 2,534,922 | 12/1950 | Marshall | 250/372 |
| 2,623,858 | 12/1952 | Kroger | 252/301.6 S |
| 3,062,958 | 11/1962 | Warner | 250/372 |
| 3,544,481 | 12/1970 | Barry | 252/301.4 F |
| 3,566,122 | 2/1971 | Paine | 250/372 |
| 3,596,097 | 7/1971 | Robillard | 250/372 |
| 3,676,361 | 7/1972 | Datta | 252/301.4 F |

*Primary Examiner*—Harold A. Dixon
*Attorney, Agent, or Firm*—Cushman, Darby & Cushman

[57] ABSTRACT

The invention concerns a sensor for measuring ultra-violet radiation over long periods. Interference filters remove unwanted radiation and a phosphor selected from zinc cadmium sulphide activated by copper and having a hexagonal crystal structure or strontium chlorosilicate activated by divalent europium with the phosphor matrix having an orthorhombic crystal structure, which converts the transmitted ultra-violet into radiation acceptable to a selenium photovoltaic cell.

7 Claims, 3 Drawing Figures

SENSORS

The present invention concerns sensors for recording ultra-violet radiation. Such sensors are particularly useful for monitoring narrow-band solar ultra-violet radiation so that the amount of ultra-violet radiation can be compared to the degree of "weathering" suffered by specimens of organic building materials exposed in weathering trials to the same solar radiation.

The outputs of such sensors are integrated so that cumulative totals are obtained, and it is important that the sensors and recording units can be left unattended for considerable periods of time, for example over several months.

One type of sensor, which will be described in greater detail hereinafter, employs a series of filters to filter out unwanted radiation, and allows the remaining narrow band of ultra-violet radiation to fall on to a phosphor. The phosphor converts the ultra-violet radiation into a proportional amount of visible radiation the intensity of which is measured by a photocell. The use of the phosphor is necessary because most photocells, and in particular the selenium photocells most commonly employed, give low outputs for radiation in the ultra-violet region.

However, it has been discovered that phosphors normally used in such sensors have non-linear emission characteristics at threshold light values. This may not be particularly important in a sensor operating over short time intervals but when cumulative measurements are being made over a number of months such non-linearities can cause considerable discrepancies.

These discrepancies can be avoided by using a phosphor which is linear throughout its emission range with respect to the range of intensities with which it may be irradiated.

Thus in accordance with the present invention there is provided a sensor for monitoring ultra-violet radiation comprising one or more filters for removing radiation in unwanted wavebands, a phosphor for converting the transmitted ultra-violet radiation into radiation acceptable to a photocell, and a photocell for converting the output radiation from the phosphor into an electric signal, and wherein the phosphor is either zinc cadmium sulphide activated by copper and having a hexagonal crystal structure or strontium chlorosilicate activated by divalent europium with the phosphor matrix having an orthorhombic crystal structure.

An embodiment of the present invention will now be described by way of example and with reference to the accompanying drawings in which.

Figure 1:
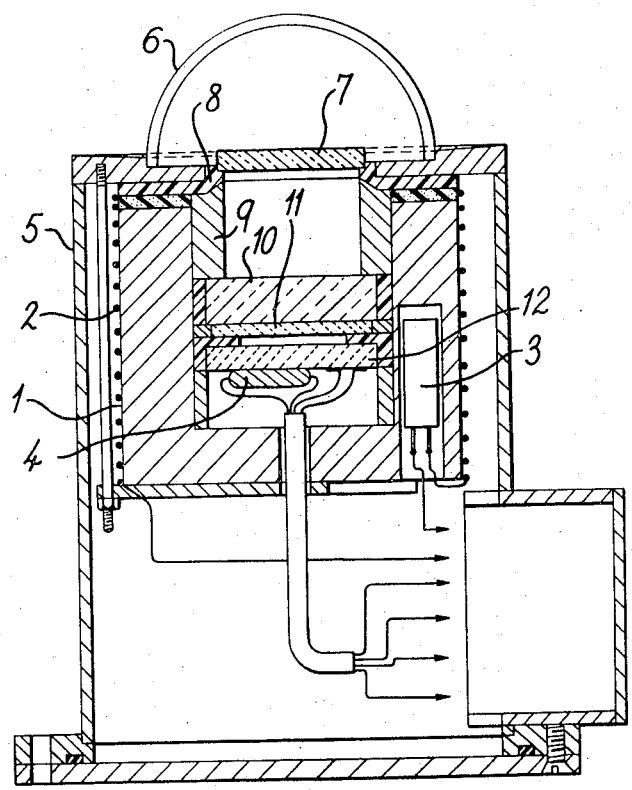
FIG. 1 is an axial section of an ultra-violet sensor constructed in accordance with the present invention.

The sensor shown in FIG. 1 of the accompanying drawings comprises a thick-walled cylindrical block 1 of aluminium wound around with a heating element 2 in the form of an insulated wire. This heating element is supplied with a suitable d.c. voltage from an external power source which is not shown and is controlled by a miniature bi-metallic thermostat 3 housed in a recess within the block 1. The temperature of the sensor is monitored remotely by a thermistor 4 which can be incorporated in a simple measuring circuit which again is not shown. The purpose of the heating element 2 and its associated circuitry is to maintain at approximately constant temperature the phosphor and selenium cell, both being temperature sensitive, regardless of ambient conditions, thus improving its linearity. Such a temperature would normally be about 42°C.

The aluminium block 1 is mounted within a cylindrical casing 5 which can be chromium plated brass or stainless steel, to provide highly reflective surfaces to reduce heat losses in winter and solar heat gain in summer.

Solar radiation enters the sensor via a dome 6 of fused silica and falls on a diffuser 7 of translucent quartz mounted on a spacer 8 of "Tufnol" (Registered Trade Mark) which is in turn supported by a metallic spacer 9 having its internal surface painted matt black to prevent radiation reaching the filter at high angles of incidence. The spacer 9 is mounted at the mouth of the aluminium block 1.

The radiation then falls on an interference filter generally indicated at 10 which removes unwanted radiation so that the only radiation transmitted is the required narrow band of ultra violet radiation with which the sensor is concerned, together with a small amount of red light. The radiation transmitted through the filter 10 falls on a band of phosphor indicated at 11.

Figure 2:
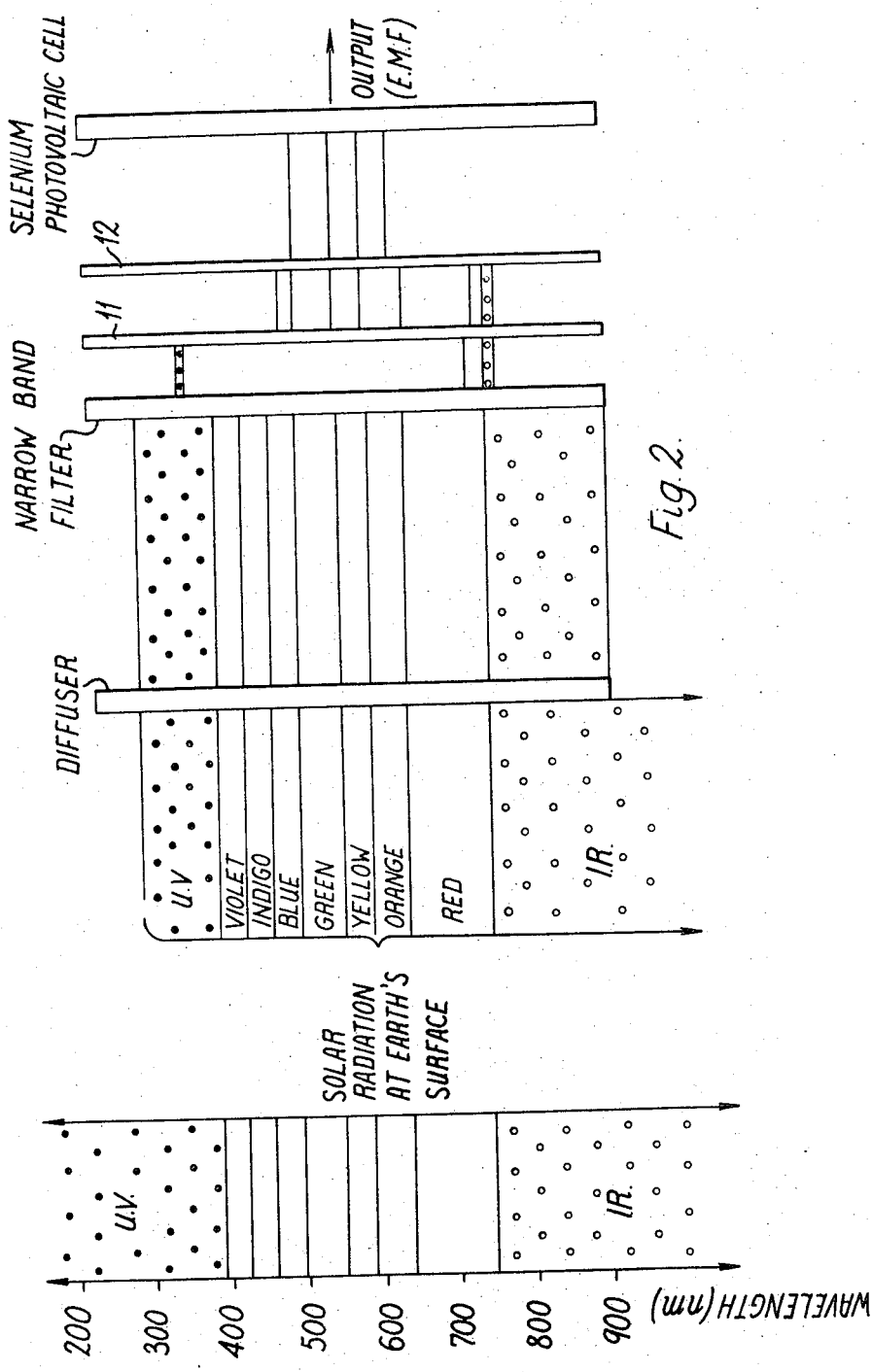
FIG. 2 is a diagram illustrating the operation of the sensor of FIG. 1.

This arrangement of diffuser, filter and phosphor can best be appreciated by the diagrams shown in FIG. 2.

The ultra-violet radiation incident on the phosphor 11 is converted into visible radiation and in order to remove the unwanted effects of the small amount of red light transmitted a further filter 12 is provided. This filter is a red absorbing filter, type Chance OB2A. The remaining narrow band of radiation falls on a selenium photovoltaic cell which gives a voltage output dependent on and proportional to the intensity of the radiation incident on it.

This output voltage is then taken to a suitable integrating device so that cumulative totals of ultra-violet radiation can be built up.

The use of a phosphor has a number of important advantages. Almost all interference filters show less than complete blockage of upper harmonic peaks, resulting in small, but significant leakages of unwanted radiation. Thus all known interference filters used to isolate narrow band widths in the solar ultraviolet region leak some red light, although in terms of total transmittance, the leakage may be less than 0.5 per cent. However, the maximum spectral sensitivity of selenium photovoltaic cells is also in the red region, so that this leakage can give rise to a considerable error signal. No commonly available filter glasses exist, (if, in fact, any exist) capable of blocking completely this spurious red light whilst transmitting in the ultra-violet region. Error signals as high as 20 per cent of of the total output signal have been recorded in the case of sensors admitting narrow-band ultra-violet radiation centred at 315 nm.

In the system described, the use of a phosphor conversion system avoids this problem, by converting the selected narrow-band of incident radiation to a broad band falling in the visible spectrum. It is then an easy matter to suppress red leakage radiation by the interposition of a simple red-absorbing filter. By this means the error signal is typically reduced to less than 0.2 per cent.

Furthermore the sensitivity of selenium cells rises to a maximum at the red end of the visible spectrum and is minimal in the near ultra-violet region. A gain in output is obtained by the conversion of ultra-violet to visible radiation, which, for example, amounts to a factor of about X6 in a 315 nm sensor.

Another advantage is that the re-emission curve of a phosphor is a broad peak, the spectral distribution of which, within certain limits, remains independent of the wavelength of the exciting radiation. The sensor therefore tends to perform as a 'non-selective' detector notwithstanding the fact that selenium cells are 'selective', i.e. the output is dependent upon the wavelength of incident energy.

Previously, silver activated phosphors have been employed. However, it has been discovered that these have non-linear emission characteristics at threshold light values. Integrating these non-linear characteristics over long periods can thus give rise to considerable errors.

Two phosphors have been discovered which are activated by substances other than silver, and which not only possess linear emission characteristics at threshold light values, but also provide the high degree of conversion efficiency required for this metering application thus affording much more accurate results.

The first of these is zinc cadmium sulphide activated by copper. This phosphor has a hexagonal crystal structure and the matrix has the composition 92 percent ZnS + 8 percent CdS by weight.

The second is strontium chlorosilicate activated by divalent europium, with the phosphor matrix having an orthorhombic crystal structure.

Both these phosphors emit in the green or bluish green when excited by ultra-violet radiation within the range 295 to 400 nm.

Figure 3:
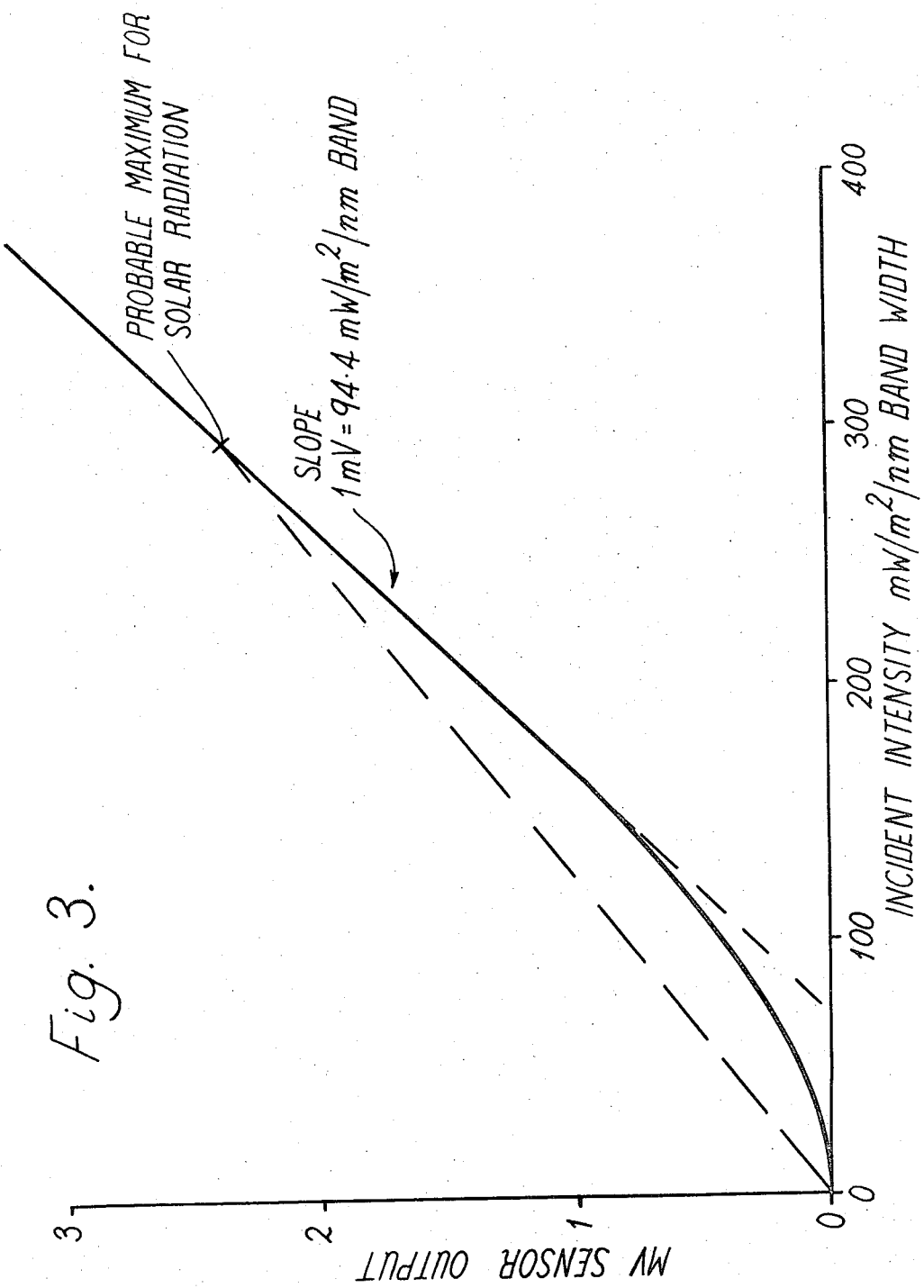
FIG. 3 is a graph illustrating the error which can be caused by a phosphor having non-linear emission characteristics.

FIG. 3 of the accompanying drawings shows a typical relationship for a 'non-linear' phosphor, working at 42°C between incident ultra-violet radiation intensity and resulting sensor output in mV. The expected maximum signal (noon, June sunshine, temperate latitudes) has been somewhat arbitrarily chosen as 300 mW/m²/nm, but is related to experience. (The theoretical curve for a strictly linear phosphor, would be represented by a straight line OX passing through the origin). Non-linearity of the conversion ratio assumes importance if it is required to be integrated with respect to time. To calibrate the integrator, a true statement of the slope is required. If the slope of the (major) linear portion is accepted, a serious degree of underestimation will occur at low intensity levels. If a straight line is drawn arbitrarily from a selected point (X) representing full scale deflection down through the origin, serious over-estimates will occur at all intensity levels, amounting, in this case, to a maximum error around mid-scale (150 mW/m²/nm) of about +16 per cent.

I claim:

1. A sensor for cumulatively monitoring ultra-violet radiation over long periods comprising one or more filters for removing radiation in unwanted wavebands, a phosphor for converting the transmitted ultra-violet radiation into radiation acceptable to a photcell, and a photocell for converting the output radiation from the phosphor into an electric signal, and wherein the phosphor is either zinc cadmium sulphide activated by copper and having a hexagonal crystal structure or strontium chlorosilicate activated by divalent europium with the phosphor matrix having an orthorhombic crystal structure.

2. A sensor as claimed in claim 1, and including heating means for maintaining the sensor at a predetermined temperature.

3. A sensor for cumulatively monitoring ultra-violet radiation over long periods comprising a metal body, a window in the body through which radiation can enter, an interference filter for removing unwanted non-ultra-violet radiation, a phosphor for converting the ultra-violet radiation into radiation acceptable to a photocell, the phosphor being selected from zinc cadmium sulphide activated by copper and having a hexagonal crystal structure or strontium chlorosilicate activated by divalent europium with the phosphor matrix having an orthorhombic crystal structure, and a photocell for converting the output radiation from the phosphor into an electrical signal.

4. A sensor as claimed in claim 3, wherein the photocell is a selenium photovoltaic cell.

5. A sensor as claimed in claim 4, and including a further filter for removing unwanted red light from the output of said phosphor.

6. A sensor for cumulatively monitoring ultra-violet radiation over long periods comprising a metal body, a quartz dome in said body through which radiation can enter, an interference filter for removing unwanted, non-ultra-violet radiation, a phosphor for converting the ultra-violet radiation transmitted into radiation of a waveband acceptable to a photocell, the phosphor being selected from zinc cadmium sulphide activated by copper and having a hexagonal crystal structure or strontium chlorosilicate activated by divalent europium with the phosphor matrix having an orthorhombic crystal structure, a second filter for removing red light from the output of said phosphor, a selenium photovoltaic cell for converting the output radiation of the phosphor into an electrical signal, and means for maintaining said sensor at a predetermined temperature.

7. A sensor for cumulatively monitoring ultra-violet radiation over long periods comprising a metal body, a quartz dome in said body through which radiation can enter, an interference filter for removing unwanted non-ultra-violet radiation, a phosphor for converting the ultra-violet radiation transmitted into radiation of a waveband acceptable to a photocell, said phosphor comprising zinc cadmium sulphide activated by copper having a hexagonal crystal structure and wherein the matrix has the composition 92 percent ZnS and 8 percent CdS by weight, a second filter for removing red light from the output of said phosphor, a selenium photovoltaic cell for converting the output radiation of the phosphor into an electrical signal, and means for maintaining said sensor at a predetermined temperature.

* * * * *